United States Patent [19]
Sakata et al.

[11] Patent Number: 4,756,389
[45] Date of Patent: Jul. 12, 1988

[54] APPARATUS FOR DETECTING A POSITION OF A CAGE IN A HYDRAULIC ELEVATOR

[75] Inventors: Kazuhiro Sakata, Katsuta; Yoshio Sakai, Naka; Tsutomu Sano; Yoichi Ono, both of Katsuta, all of Japan

[73] Assignee: Hitachi, Ltd., Tokyo, Japan

[21] Appl. No.: 78,998

[22] Filed: Jul. 29, 1987

[30] Foreign Application Priority Data

Aug. 1, 1986 [JP] Japan ................................. 61-179989

[51] Int. Cl.$^4$ .............................................. B66B 3/02
[52] U.S. Cl. ..................................... 187/134; 187/110
[58] Field of Search ........................ 187/110, 134, 136

[56] References Cited

U.S. PATENT DOCUMENTS

| | | | |
|---|---|---|---|
| 4,009,766 | 3/1977 | Satoh | 187/134 X |
| 4,124,103 | 11/1978 | Otto et al. | 187/134 |
| 4,142,609 | 3/1979 | Tachino | 187/136 X |
| 4,368,518 | 1/1983 | Terazono et al. | 187/136 X |
| 4,627,518 | 12/1986 | Meguerdichian et al. | 187/134 |

Primary Examiner—William M. Shoop, Jr.
Assistant Examiner—W. E. Duncanson, Jr.
Attorney, Agent, or Firm—Antonelli, Terry & Wands

[57] ABSTRACT

In a cage position detector for a hydraulic elevator, there is provided a detector for measuring the time duration of the power failure, when the power fails. An amount of sinkage of a cage during the power failure is obtained by the time duration of the power failure and an average sinkage amount per unit time provide in advance. A cage position, which has been detected just before the power failure, is corrected by the above obtained amount of sinkage of the cage. A cage position, from which the elevator is to reopen a normal operation for service after the recovery of power, is specified by the corrected cage position.

According to the present invention, even though the cage sinks during the long power failure, it is prevented to lose the true present position of the cage, from which the elevator is to reopen the normal operation after the recovery of power.

6 Claims, 5 Drawing Sheets

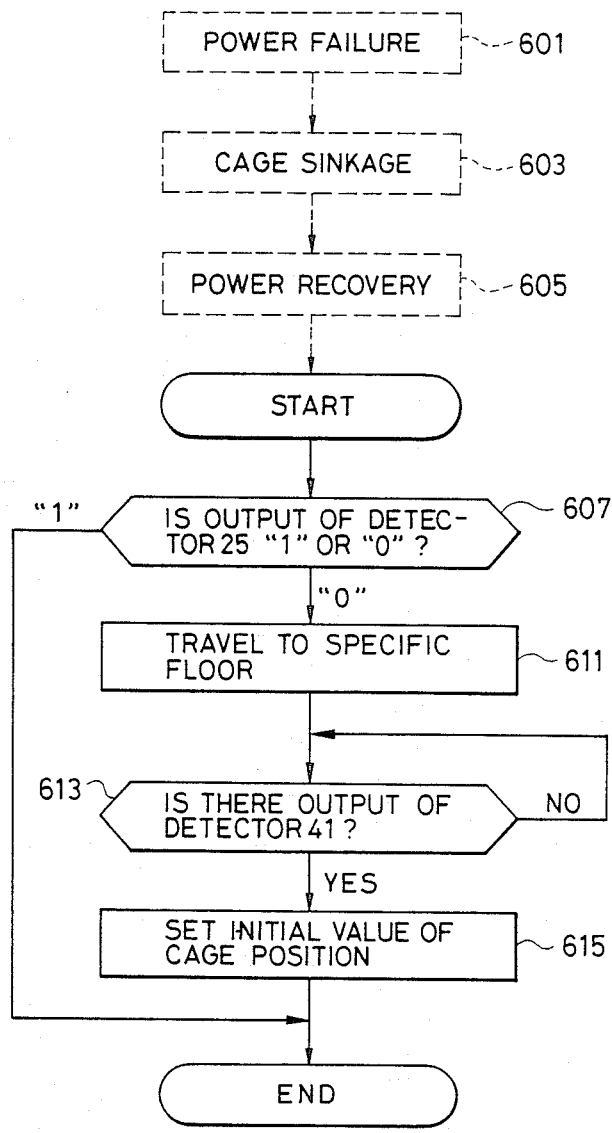

APPARATUS FOR DETECTING A POSITION OF A CAGE IN A HYDRAULIC ELEVATOR

BACKGROUND OF THE INVENTION

1. Field of The Invention

The present invention relates to an apparatus for detecting a position of a cage of a hydraulic elevator with an accuracy of several millimeters through the whole service travel between a bottom floor and a top floor, particularly to an apparatus capable of specifying the position of a cage, which stops due to the power failure and sinks due to the discharge of oil from a hydraulic jack occurring during the power failure, for reopening of a normal operation for service after the recovery of power.

2. Description of The Related Art

A conventional hydraulic elevator has not been provided with a cage position detector using such a pulse generator as generates a pulse for every predetermined distance of the travel of an elevator cage. This is because, in a hydraulic elevator, the number of floors served by the elevator was generally not so large and further the fine position of a cage has not been required because of the simplicity of the speed control.

In addition thereto, there was a particular reason in a hydraulic elevator why a position detector of the type as mentioned above has not been employed. A hydraulic elevator generally has no braking device of such a type as a so called rope type elevator has, and a cage thereof is supported by a hydraulic jack which is filled up with pressure oil, during the cage stops. Therefore, if the cage stops for long time, it sinks little by little, since the pressure oil is gradually discharged from the hydraulic jack by the leakage of oil in various valves included in the hydraulic system. It is difficult to prevent the leakage of oil perfectly. Accordingly, in the normality of power, a hydraulic pump was operated to make the cage rise, when the amount of the sinkage thereof reached a predetermined value.

During the power failure, however, the pump can not be operated, so that the cage continues to sink gradually. Even if a position, at which a cage stops due to the power failure, is detected and memorized, an actual location at which the cage positions after a while is different from the position memorized. It was very difficult to make sure of a location where the cage positions at the time of the recovery of power. If the present position of a cage is lost, the elevator can no longer controlled normally.

To this end, every time the power failure occurs, the cage was traveled to a specific floor so that the location where the cage positions at the time of the recovery of power could be specified. This was done for the preparation of the reopening of a normal operation for service after the recovery of power. Namely, the elevator can always reopen the normal operation from the specific floor after the power recovers.

Further, in a hydraulic elevator, such a preparatory operation as mentioned above is possible by discharging pressure oil from a hydraulic jack by a manual control. Accordingly, the preparatory operation is a downward running, and therefore the specific floor was generally selected at a lowest floor.

For a rope type elevator, there have been developed a cage position detector which can cope with various problems accompanied by the power failure. Such a detector detects the traveling distance of the cage from the occurrence of the power failure to the actual stop of the cage. Once the cage has been stopped by a braking device, it never moves during the braking force is effective. Therefore, the detector is sufficient to be operable only during the very short time from the occurrence of the power failure to the actual stop of the cage. The thus detected position can be maintained by a little of backup power.

By the way, the application of hydraulic elevators is widened again and again. As a result, the number of floors to be served by a hydraulic elevator increases and a concern is being paid about the detection of the fine position of a cage. Then, it is considered to apply such a cage position detector as developed for a rope type elevator to a hydraulic elevator. However, in case such detector is applied to a hydraulic elevator, the detector must be maintained operable throughout the duration of the power failure, since, as mentioned above, the cage continues to sink during the whole duration of the power failure. To provide an auxiliary power for maintaining the detector operable throughout the duration of the power failure is very costly and therefore disadvantageous for an economy-oriented hydraulic elevator.

SUMMARY OF THE INVENTION

An object of the present invention is to provide an economical cage position detector for a hydraulic elevator which is capable of finely detecting a position of a running cage and specifying a cage position from which the elevator is to reopen a normal operation for service after the recovery of power, even though the cage sinks during the power failure.

A feature of the present invention is in that, in a cage position detector having means for generating a pulse for every predetermined distance of the travel of a cage, means for counting pulse generated by the pulse generating means to obtain the cage position and means for storing the obtained cage position, there is further provided means for detecting the time duration of the power failure, and a location, from which the elevator is to reopen a normal operation for service after the recovery of power, is specified on the basis of the time duration of the power failure measured by the detecting means.

According to one of detailed features of the present invention, a cage position stored in the storing means at the time of the stop of the cage due to the power failure is corrected on the basis of the time duration of the power failure measured by the detecting means, and a location, from which the elevator is to reopen the normal operation after the recovery of power, is specified by the corrected cage position.

Further, according to another detailed feature of the present invention, the time duration measured by the detecting means is judged, and a location, from which the elevator is to reopen the normal operation after the recovery of power, is selectively specified in accordance with the judgment result.

BRIEF DESCRIPTION OF THE DRAWINGS

FIG. 6 is a flow chart of the operation in another embodiment.

DESCRIPTION OF THE PREFERRED EMBODIMENTS

Figure 1:
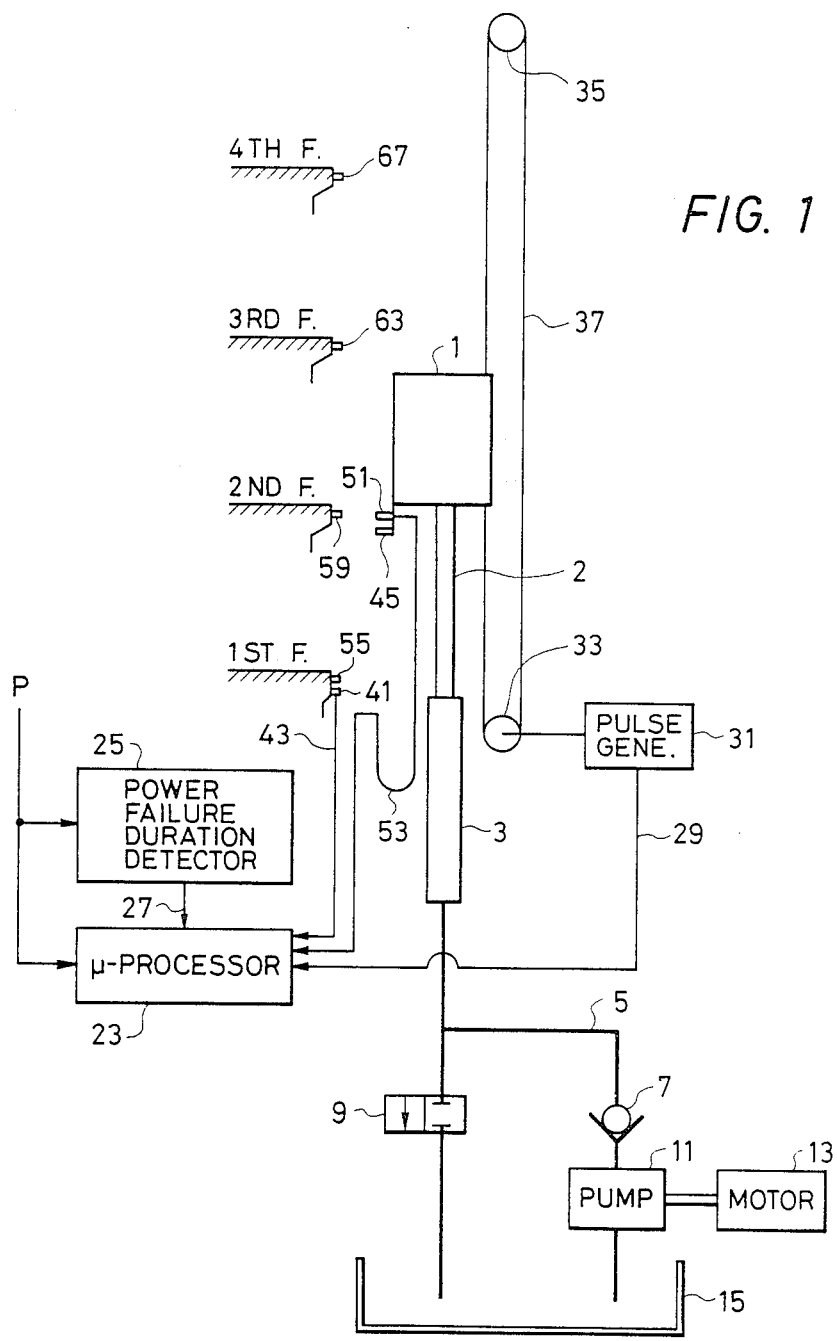
FIG. 1 schematically shows the whole configuration of a control apparatus for a hydraulic elevator, in which a cage position detector according to an embodiment of the present invention is included.

Referring to FIG. 1, there is shown the whole configuration of a control apparatus for a hydraulic elevator serving four floors, in which a cage position detector according to an embodiment of the present invention is employed.

In the figure, an elevator cage 1 travels within an elevator shaft by the movement of a hydraulic jack composed of a piston 2 and a cylinder 3. The piston 2 is moved by pressure oil supplied for the cylinder 3, which is connected to a check valve 7 and an electromagnetic valve 9 through a pipe 5. The check valve 7 is further connected to an oil pump 11. When the pump 11 is driven by a motor 13, the pressure oil is supplied from an oil tank 15 to the cylinder 3 through the check valve 7, so that the cage 1 travels upward. When the electromagnetic valve 9 is excited to be opened, the pressure oil within the cylinder 3 is discharged to the oil tank 15 and the cage 1 travels downward.

Although an appropriate electric power is supplied to the motor 13 from a power source P, it is omitted in the figure. Further, the power supplied to the motor 13 is controlled on the basis of an output of the microprocessor 23. In the figure, however, the connection therebetween is also omitted in the figure, since it is the same as in an conventional apparatus.

To the microprocessor 23 are inputted various input signals, which will be referred to in the following. A power failure time duration detector 25 senses the voltage of the power source P and detects the occurrence of the power failure. When the power failure occurs, the detector 25 actuates a counter included therein by a backup power and counts clock pulses generated by a clock generator also included therein so that the time duration of the power failure is measured. Since only the clock generator and the counter are operated during the power failure, the large backup power is not necessary. When the power recovers, the measured time duration of the power failure is taken in the microprocessor 23 through a line 27 as one of its input signals.

The position of the cage 1 is detected by a pulse generator 31, an output of which is also led to the microprocessor 23 through a line 29. The pulse generator 31 is coupled to a lower pulley 33. Between the lower pulley 33 and an upper pulley 35, there is provided a rope 37, both ends of which are fixed to the cage 1. Accordingly, the pulse generator 31 is driven by the movement of the cage 1 so that one pulse is generated every a few millimeters (generally, every 2.5 mm) of the travel of the cage 1. These pulses are counted up in the microprocessor 23 when the cage 1 travels upward and counted down when the cage 1 travels downward, whereby the position of the cage 1 can be detected.

A reed switch of a specific floor detector 41 is provided at a predetermined position of a specific floor; a first floor in this embodiment. On the other hand, the cage 1 is equipped with a magnet 45 at such a portion thereof that the magnet 45 faces the reed switch when the cage 1 lands at the first floor accurately. Therefore, when the cage 1 lands at the first floor, the reed switch is operated by the magnet 45 so that the specific floor detector 41 produces an output signal. This signal is led to the microprocessor 23 through a line 43 as an input representative of the landing of the cage 1 at the specific floor.

Further, a reed switch of a floor detector 51 is provided on the cage 1. On the other hand, there are installed magnets 55, 59, 63 and 67 at appropriate positions of the respective floors. Every time the cage 1 lands the respective floors accurately, the reed switch 51 faces the corresponding magnets 55, 59, 63 and 67 so that the floor detector 51 produces an output signal. The output signal is led to the microprocessor 23 through a line 53 as a signal representative of the landing of the cage 1 at the respective floors. Further, a counter for counting the pulses generated by the pulse generator 31 is cleared and reset with an appropriate value specifically predetermined for the respective floors, every time the floor detector 51 produces its output. The specific values predetermined for the respective floors are obtained in advance by a trial running of the cage 1.

Figure 2:
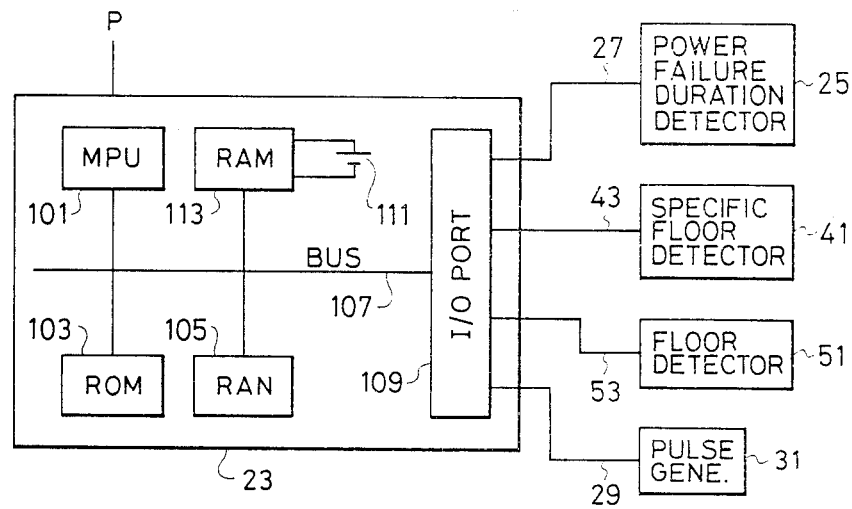
FIG. 2 is a block diagram schematically showing a cage position detector according to an embodiment of the present invention.

Referring next to FIG. 2, the description will be made of the configuration of a cage position detector according to an embodiment of the present invention. In the figure, the same reference numerals denote the same components as in FIG. 1. The microprocessor 23 comprises a microprocessing unit (MPU) 101, a read-only memory (ROM) 103 for storing a program to be executed in MPU 101 and a random access memory (RAM) 105 for storing various data. MPU 101, ROM 103 and RAM 105 are coupled with each other through a bus 107, which is further coupled to an input/output port 109. To the I/O port 109 are connected external resources such as the power failure time duration detector 25, the specific floor detector 41, the floor detector 51 and the pulse generator 31, through the input lines 27, 43, 53 and 29, respectively. Further, although some output lines are connected to the I/O port 109 in order to derive signals for controlling the motor 13, they are omitted in the figure.

There is further provided in the microprocessor 23 another random access memory (RAM) 113 with a battery 111 as a backup power. In RAM 113, there is prepared a counter for counting up or down the pulses generated by the pulse generator 31. Therefore, RAM 113 always holds data of the present position of the cage 1. RAM 113 also stores the distances between the respective floors and the specific floor in terms of the number of pulses generated by the pulse generator 31. With this, the position can be corrected if the error occurs in the detection of the cage position. Further, it is of course that, if RAM 105 is backed up for the power failure, the function of RAM 113 as mentioned above can be achieved by RAM 105 and RAM 113 can be omitted.

Figure 3:
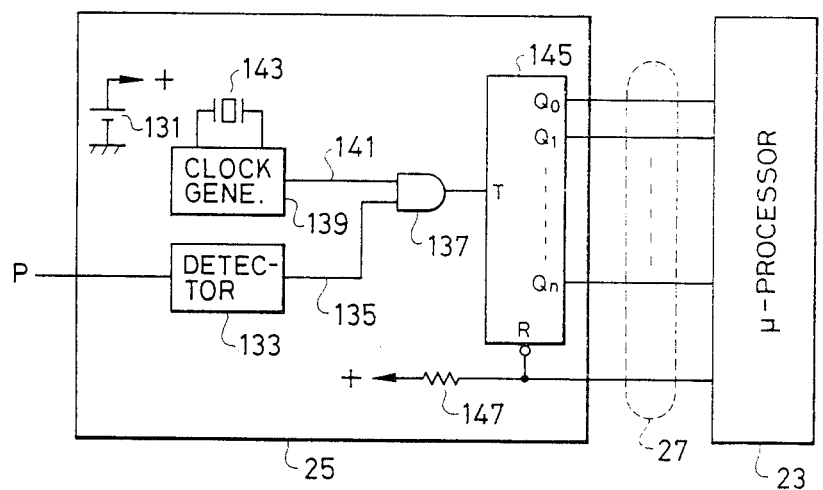
FIG. 3 schematically shows the structure of a power failure time duration detector utilized in the cage position detector of FIG. 2.

Referring next to FIG. 3, the detailed structure of the power failure time duration detector 25 will be explained. In the figure, a battery 131 supplies power for all components of the detector 25, whereby the detector 25 can operate even during the power failure. A voltage detector 133 always senses the voltage of the power source P and, if the voltage is higher than a predetermined value, produces no output. When the source voltage disappears, the detector 133 produces the output. The output of the detector 133 is led to one of terminals of a two-input AND gate 137 through a line 135. A clock generator 139 has a crystal oscillator 143 and generates clock pulses of the constant frequency. In this embodiment, the period of the clock pulses is 1 msec. The clock pulses are applied to the other terminal of the AND gate 137 through a line 141.

An output of the AND gate 137 is led to a clock input terminal T of a binary counter 145. The counter 145 makes all outputs $Q_0$ to $Q_n$ logical "0" when an inverted reset input R is logical "0". Terminals of the outputs $Q_0$ to $Q_n$ and the reset input R are coupled to the microprocessor 23 through the line 27. Further, the reset input terminal R is connected to the battery 131 through a resister 147, whereby the counter 145 is never cleared even if the reset input from the microprocessor 23 becomes "0" due to the power failure, because the reset input R is is maintained high by the voltage applied from the battery 131 through the resistor 147. The power failure time duration detector 25 structured as above does not operate during the normality of power, and the reset input R from the microprocessor 23 is maintained at "1".

If the power fails, the detector 133 produces the output, so that the clock pulses on the line 141 are given to the counter 145 through the AND gate 137. The counter 145 initiates counting the clock pulses, and as a result, outputs $Q_0$ to $Q_n$ appear successively. When the power recovers, the output of the detector 133 disappears and therefore the clock pulses are blocked by the AND gate 137. Thereafter, the content of the counter 145 does not change and outputs $Q_0$ to $Q_n$ are maintained at the state when the power recovers. When the microprocessor 23 restarts its processing operation due to the recovery of power, it takes outputs $Q_0$ to $Q_n$ of the counter 145 therein. The microprocessing unit 101 calculates the time duration T of the power failure on the basis of $Q_0$ to $Q_n$ taken therein and stores it temporarily in RAM 105.

On the other hand, the average amount K of sinkage of the cage per unit time is obtained in advance and stored in RAM 105 of the microprocessor 23. Both the time T and the average sinkage amount K are read out and multiplied by each other, so that the whole amount of sinkage of the cage 1 during the power failure can be obtained.

Figure 4:
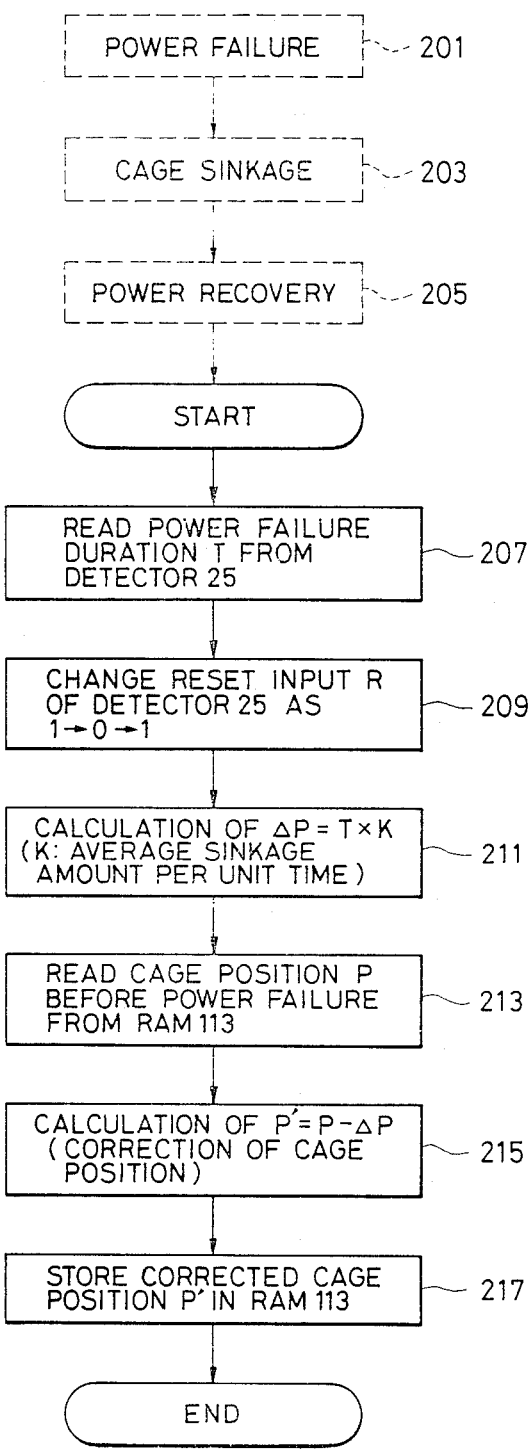
FIG. 4 flow chart of the operation of the cage position detector shown in FIG. 2.

Referring to a flow chart of FIG. 4, the description will be made of the processing operation for the correction of the present position of the cage executed by the microprocessor 23 after the recovery of the power. In FIG. 4, three steps 201, 203 and 205 do not represent processing steps of the microprocessor 23, but the phenomena in the elevator from the power failure to the recovery thereof.

When the power failure occurs (step 201), the elevator cage 1 stops and thereafter is maintained at that position by the hydraulic jack. During the power failure, as already described, the cage 1 continues to sink due to the leakage of oil (step 203). In the meantime, the power failure time duration detector 25 continues to measure the time duration of the power failure, as already described. When the power recovers (205), the following processing operation is initiated in order to specify the present position of the cage 1, which has sinked during the power failure.

When the microprocessor 23 is initiated due to the recovery of power, it calculates the time duration T of the power failure on the basis of the value taken therein from the counter 145 of the power failure time duration detector 25 and stores it in RAM 105 (step 207). After the completion of read of the content of the counter 145, the microprocessor 23 changes the reset input R from "1" to "0" to clear the counter 145 and returns it to "1" again for the preparation of the succeeding operation (step 209). Then, the multiplication is carried out between the time duration T and the average sinkage amount K per unit time read out from RAM 105, so that the whole amount ΔP of the sinkage of the cage 1 during the power failure can be obtained (step 211).

The cag position P before the power failure, which is kept in RAM 113 by by the backup power 111, is read out (213). The whole amount ΔP of sinkage of the cage 1 is subtracted from the cage position P before the power failure and, as a result, the corrected cage position P' can be obtained (step 215). After the corrected cage position P' thus obtained is stored in RAM 113 (step 217), the processing operation ends. The normal operation for service is reopened by taking the location specified by the corrected cage position P' in a control apparatus of the elevator.

In this manner, according to the embodiment mentioned above, the elevator can reopen the normal operation just after the power recovers, since a true present position of the cage can be specified immediately. Therefore, there is no necessity of such a preparatory operation as has been carried out in a conventional hydraulic elevator in order to specify a present cage position for the reopening of the normal operation after the power recovery.

By the way, let us discuss a few points about the time duration of the power failure and an actual situation of the operation for service of the elevator in the following.

Assuming that the time duration of the power failure is not so long, for example, ten minutes or so, the amount of sinkage of the cage is so small that the cage position is not necessary to be corrected for the reopening of the normal operation at the time of the recovery of power, if only the hydraulic elevator is well maintained in accordance with the ordinal maintenance rule. To the contrary, in a case of such a long power failure as exceeds about thirty or fourty minutes, there is no situation where passengers are left in the cage until the power recovers, because passengers left in the cage are usually rescued within about thirty minutes.

Therefore, in view of the actual situation of the operation for service and the efficiency of the operation control, the time duration of the power failure is better to be discussed divided into a few cases; three cases in the example mentioned above, i.e., a first case where the time duration is less than ten minutes or so, a second one where it is between about ten minutes and thirty or fourty minutes, and a third one where it is longer than the second case. Further, it is to be noted that the aforesaid times for classifying the time duration of the power failure are not fixed but greatly depend upon various factors, main one of which is, as already described, the state of the maintenance of the elevator.

In the first case, since the amount of sinkage of the cage is very small, the elevator can reopen the normal operation immediately at the time of the recovery of power, without any correction of the cage position. If the time duration of the power failure becomes longer and gets into the second case, the cage position is necessary to be corrected in accordance with the method as already mentioned.

In case the time duration of the power failure becomes much longer and results in corresponding to the aforesaid third case, the rescue operation is carried out as described above. For the rescue of the passengers, the cage is traveled downward by a manual control to a nearest floor, and thereafter the cage is further traveled downward to a specific floor predetermined in advance and stands by there to reopen the normal operation for service. In this case, since there are no passengers in the cage, nobody is inconvenienced, even though the preparatory operation of the cage as mentioned above for the reopening of the normal operation is carried out. Also, the same is true of the case where the power fails during the cage travels with no passenger.

Therefore, the following embodiment will be considered. Namely, the measured time duration of the power failure is judged by means of a few criteria provided in advance. If it is shorter than a predetermined value, the elevator enters into the normal operation from the location where the cage stops at that time immediately after the power recovery, without any correction of the cage position. If the measured time duration is longer than the predetermined value, but does not exceed another predetermined value, the cage position is corrected on the basis of the measured time duration of the power failure at the time of the power recovery and thereafter the cage starts the normal operation from the location which is specified by the corrected cage position. Further, in case the measured time duration exceeds the another predetermined value and the passengers have been rescued, the cage enters into the normal operation from the location where the cage stops at that time, since in this case the cage is traveled to the specific floor and stands by there.

Figure 5:
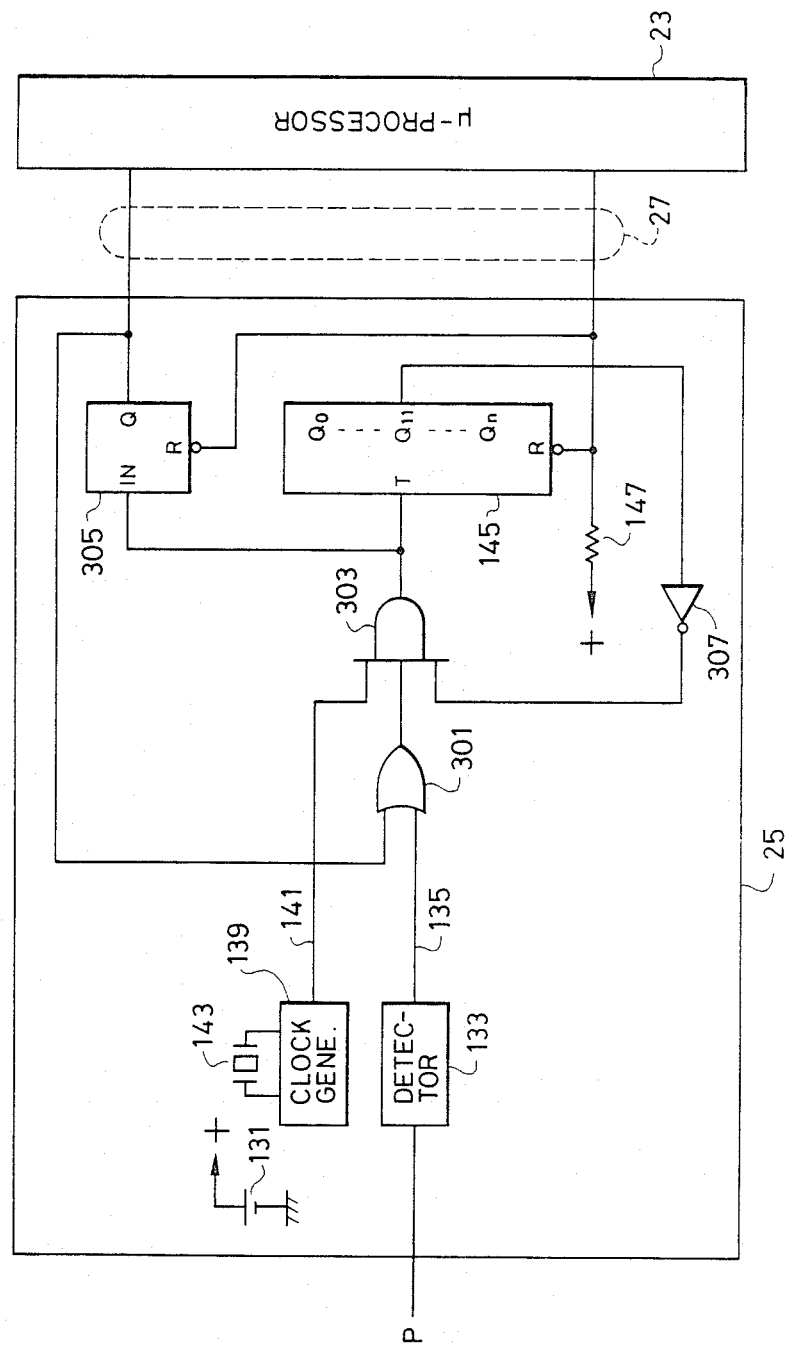
FIG. 5 schematically shows the structure of another example of the power failure time duration detector.

In the following, the description will be made of the case where the time duration of the power failure exceeds the another predetermined value and the cage is traveled to the specific floor. FIG. 5 shows the detailed structure of a power failure time duration detector 25, which is employed in this case. The same reference numerals represent the same components as in FIG. 3. In this detector 25, there is provided a two-input OR gate 301, to which the output of the detector 133 is applied as one of the inputs thereof. An output of the OR gate 301 is led to a three-input AND gate 303 as one of the inputs thereof. The clock pulses from the clock generator 139 are supplied to the AND gate 303 as another input thereof. An output of the AND gate 303 is led to clock terminal T of the binary counter 145 as well as to terminal IN of a one-shot multivibrator 305, output Q of which is led to another input of the OR gate 301. The output of the multivibrator 305 is also led to the microprocessor 23 through the line 27.

One of the terminals of the counter 145, $Q_{11}$ in the example shown, is connected to an inverter 307. It is assumed in this example that an output appears at terminal $Q_{11}$ after thirty minutes from the initiation of the counting operation in the counter 145. An output of the inverter 307 is supplied to a third input of the AND gate 303. The reset signal from the microprocessor 23 is applied to inverted reset terminals R of both the counter 145 and the multivibrator 305. In this power failure time duration detector 25, as apparent from the figure, the connection thereof with the microprocessor 23 is performed by only two lines.

If the power failure occurs, the output of the detector 133 is applied to the AND gate 303 through the OR gate 301. The output of the inverter 307 is already applied to the AND gate 303, and therefore the clock pulses are led to terminal T of the counter 145 when the output of the detector 133 is applied to the AND gate 303. The counter 145 starts to count up the clock pulses, and when the content of the counter 145 becomes equal to the value corresponding to thirty minutes, the counter 145 produces the output at terminal $Q_{11}$. The input of the inverter 307 is changed to high level by the output of terminal $Q_{11}$, so that the output thereof, i.e., the input of the AND gate 303, disappears thereby to prevent the clock pulses from being applied to the counter 145. Namely, the counter 145 continues the counting operation only within thirty minutes.

On the other hand, during the clock pulses are applied to terminal IN of the multivibrator 305, output Q thereof is maintained high. If, however, the clock pulses applied thereto disappears, the multivbirator 305 changes its state after a time constant thereof and output Q thereof becomes low. If, therefore, the microprocessor 23 senses output Q of the multivibrator 305, it can be discriminated whether or not the power failure continues more than thirty minutes, namely the high level of output Q means that the time duration of the power failure was less than thirty minutes and the low level thereof means that the power failure continued longer than thirty minutes. Further, if a terminal of the counter 145, from which the input to the inverter 307 is derived, is changed, the time to be detected by the detector 25 can be selected arbitrarily.

Referring next to a flow chart of FIG. 6, the aforesaid operation will be explained. In the following explanation, for the simplification of the description, there is taken the case as an example, in which if the time duration of the power failure is less than thirty minutes, the correction of the cage position is not carried out and the location, at which the cage stopped due to the power failure, is specified for the reopening of the normal operation after the recovery of power. However, it is of course that this embodiment can be combined with the foregoing embodiment.

In the flow chart of FIG. 6, steps 601, 603 and 605 do not represent steps of the processing operation, but the phenomena occurring in the elevator from the occurrence of the power failure to the recovery thereof, similarly to steps 201, 203 and 205 in FIG. 4.

During the power is in the normality, both the counter 145 and the one-shot multivibrator 305 are cleared or reset by the reset signal from the microprocessor 23. If the power fails (step 601), the cage begins to sink (step 603), and the counter 145 initiates counting up the clock pulses from the clock generator 139 and produces an output at terminal $Q_{11}$ thereof after thirty minutes. If the power recovered within thirty minutes, output Q of the multivibrator 305 is maintained at the high level. If the power failure continued longer than thirty minutes, output Q of the multivibrator 305 changes to the low level.

After the power recovers, the microprocessor 23 starts to execute the processing of FIG. 6, and the state of output Q of the multivibrator 305 is at first discriminated (step 607). If output Q of the multivibrator 305 is "1", the processing operation of FIG. 6 is ended, since the time duration of the power failure cases within thirty minutes and therefore the amount of sinkage of the cage is not so large.

If the state of output Q of the multivibrator 305 is "0", a command for traveling to a specific floor is given to the cage (step 611). The cage continues to travel until the specific floor detector 41 detects the specific floor (step 613). If the cage reaches and stops at the specific floor, the cage position, which is stored in RAM 113, is replaced by the value representative of the specific floor (step 615), namely, the cage position within RAM 113 is initialized. Then, the processing of FIG. 6 is ended.

According to the present invention, the position of a running cage can be finely detected. In addition, it is possible to easily specify a location from which the elevator is to reopen a normal operation after the recovery of power, even though the cage sinks due to the power failure.

We claim:

1. A cage position detector for a hydraulic elevator having means for generating a pulse for every predetermined distance of the travel of a cage, means for counting pulses generated by said pulse generating means to obtain the cage position and means having a backup power for storing the obtained cage position,
    characterized in that
    there is further provided means for measuring the time duration of the power failure, when the power fails, and
    a location of the cage, from which the elevator is to reopen a normal operation for service after the power recovers, is specified on the basis of the time duration of the power failure measured by said measuring means.

2. A cage position detector as defined in claim 1, wherein the amount of sinkage of the cage during the power failure is obtained on the basis of the time duration of the power failure measured by said measuring means, the cage position, which is stored in said storing means just before the power failure, is corrected by the above obtained amount of sinkage of the cage, and the location of the cage, from which the elevator is to reopen the normal operation for service after the recovery of power, is specified by the corrected cage position.

3. A cage position detector as defined in claim 2, wherein the amount of sinkage is calculated by multiplying the average sinkage amount per unit time obtained in advance by the time duration of the power failure measured by said measuring means.

4. A cage position detector as defined in claim 2, wherein the correction of the cage position stored in said storing means is carried out only in the case where the time duration of the power failure measured by said measuring means exceeds a first predetermined value.

5. A cage position detector as defined in claim 4, wherein the correction of the cage position stored in said storing means is carried out only in the case where the time duration of the power failure measured by said measuring means exceeds the first predetermined value and is shorter than a second predetermined value which is larger than the first predetermined value.

6. A cage position detector as defined in claim 5, wherein the cage is traveled to a specific floor determined in advance when the time duration of the power failure measured by said measuring means exceeds the second predetermined value.

* * * * *